United States Patent [19]

Blumhof

[11] 4,149,305

[45] Apr. 17, 1979

[54] METHOD OF MAKING DECORATIVE ATTACHMENT FOR A KEY RING

[75] Inventor: Roy Blumhof, Montvale, N.J.

[73] Assignee: Joy Insignia, Inc., Guttenberg, N.J.

[21] Appl. No.: 887,073

[22] Filed: Mar. 16, 1978

[51] Int. Cl.² .............................................. B23P 17/00
[52] U.S. Cl. ..................................... 29/417; 29/428; 29/432; 70/457; 156/93; 428/104
[58] Field of Search ..................... 29/428, 432, 469.5, 29/417; 70/457, 458; 156/93; 428/104

[56] References Cited

U.S. PATENT DOCUMENTS

| | | | |
|---|---|---|---|
| 695,059 | 3/1902 | Kellogg | 70/457 UX |
| 1,731,089 | 10/1929 | Adams | 29/428 |
| 1,855,003 | 4/1932 | Snarck | 428/104 |
| 2,266,953 | 12/1941 | Blue | 156/93 X |
| 2,312,204 | 2/1943 | Weindel | 70/457 X |
| 2,399,973 | 5/1946 | Albin | 428/104 |
| 2,663,106 | 12/1953 | Owen | 428/104 |
| 3,200,021 | 8/1965 | Clark | 156/93 |
| 3,557,436 | 1/1971 | Hodes | 29/428 |
| 3,659,759 | 5/1972 | Walton | 70/458 X |
| 3,969,811 | 7/1976 | Zahn | 29/417 |

*Primary Examiner*—Charlie T. Moon
*Attorney, Agent, or Firm*—Henry R. Lerner

[57] ABSTRACT

A method of making a decorative attachment for a key ring wherein a plastic base material is embroidered with a plurality of side-by-side decorative designs. The plastic base material is thereafter laminated at the back side thereof with a plastic finish by heat sealing, after which the base material is cut into a panel having mirror symmetrical panel sections separated by a narrower neck section. The die cut panel is thereafter folded midway of the neck section whereby the panel sections are in juxtaposed relation with the peripheral edges thereof being overedged, leaving the neck section periphery unsecured to define a passageway for insertion therein of a key ring.

4 Claims, 5 Drawing Figures

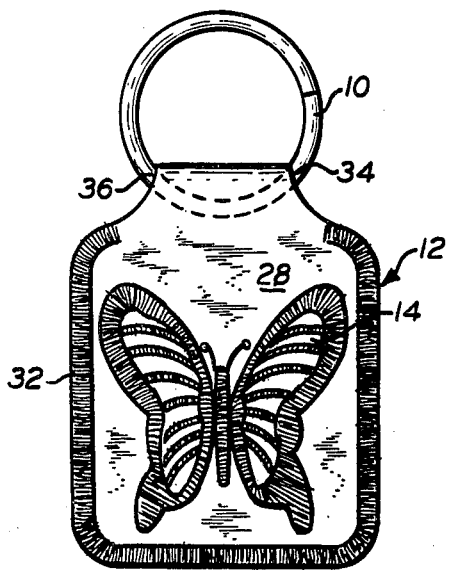
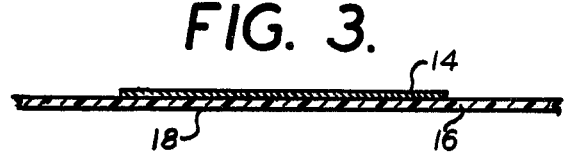
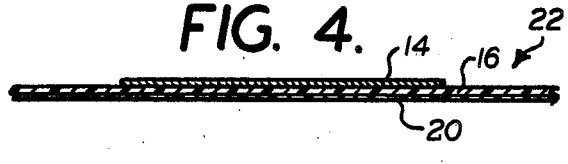
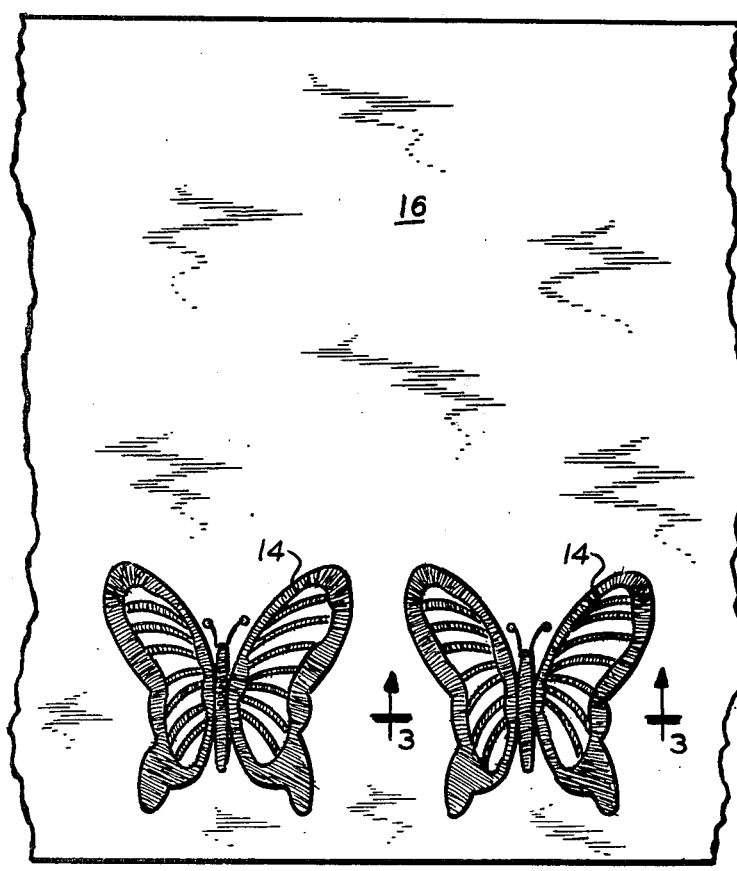
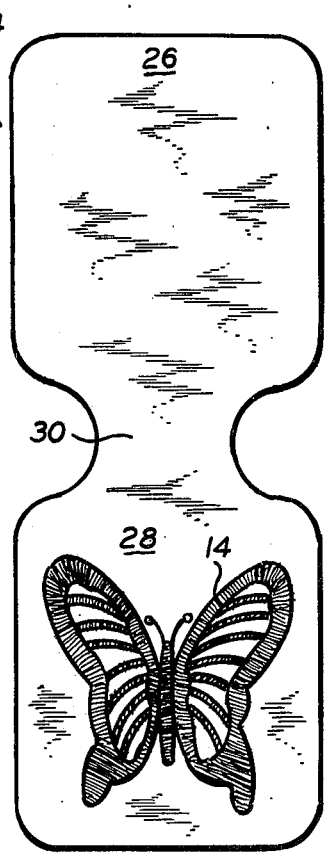

METHOD OF MAKING DECORATIVE ATTACHMENT FOR A KEY RING

BACKGROUND OF THE INVENTION

The present invention relates to a novel decorative key ring and a method for making the same.

A conventional key ring usually comprises a ring having approximately two convolutions closely held together by the natural resiliency of the metal forming the ring. Keys are held in the key ring by inserting one of the free ends of the convolutions into the conventional aperture of the key and moving the key relative to the ring until the other free end of the convolutions is passed through the key aperture whereby the key is maintained within the ring.

It is also conventional to provide the key ring with an attachment which is decorative and often serves the function of identifying the owner or the purpose for the key, by way of initials or other indicia. Such attachments, however, are rarely attractive or durable primarily because the cost of conventionally making such attachments attractive and durable is too great in relation to the overall realistic value of a key ring. The most attractive way of providing decorative material to such attachment is by way of embroidery and the cost of doing so in a conventional key ring attachment is so great as to substantially preclude use of such embroidered designs.

It is therefore an object of the invention to provide a decorative attachment for a key ring provided with an embroidered design in an economical manner not previously known in the prior art.

SUMMARY OF THE INVENTION

In accordance with the invention, the base material defining the key ring attachment comprises a cast urethane, expanded and unsupported plastic. This base material is then cut into 15 yard length sections so that they can be multiply embroidered on 15 yard Schiffli looms, in side-by-side relation. The embroidery is usually effectuated with polyester and nylon yarns.

Following the embroidering of the base material, namely, the embroidering of side-by-side ornamental representations, the base material containing such embroidered ornamental representations is processed through a machine which draws the loose threads and cuts them off. The base material section has thereafter laminated to the back side thereof, by heat sealing, a plastic sheet which imparts to the laminated combination body and rigidity and which also facilitates the further steps in the process.

Following such lamination, the sections are die cut into panels to the requisite shape which usually consists of two main body portions separated by an intermediate narrower neck section, said body portions being in mirror symmetry with each other. This enables the die cut sections to be folded over so that the two body portions are in juxtaposed relation to permit overedging (merrowing by a triple needle merrow machine) of the matching peripheries of such juxtaposed body portions, leaving however the narrower neck portion unmerrowed. The merrowing leaves the tails of the overedging yarn exposed, which tail is thereafter pulled through the back side of the merrow overlock with the excess being cut off. This completes the manufacture of the key ring attachment with such attachment now being in condition to have the key ring passed through the neck portion of the attachment so that the key ring is ready for actual use.

BRIEF DESCRIPTION OF THE DRAWINGS

FIG. 1 is a plan view of the completed key ring attachment including the key ring;

FIG. 2 is a plan view of the base material having embroidered thereon a pair of decorative designs;

FIG. 3 is a section taken along line 3—3 of FIG. 2;

FIG. 4 is a section similar to FIG. 3 but showing the lamination of a plastic sheet to the base material; and FIG. 5 is a plan view of a single die cut panel following the lamination of the plastic sheet onto the back side of the base material.

DESCRIPTION OF THE PREFERRED EMBODIMENT

Referring now to FIG. 1, there is shown a conventional key ring 10 connected to a decorative attachment 12 having a decorative design 14 embroidered thereon as more fully described hereafter.

FIGS. 2 and 3 illustrate the first step in the manufacturing of attachment 12. More specifically, there is provided a base material 16 which is a cast urethane, expanded and unsupported plastic, and is cut in approximately 15 yard lengths. Thereafter, a plurality of designs 14 are multiply embroidered on base material 16 in side-by-side relation by means of a 15 yard Schiffli loom, the thread used for the embroidery comprising polyester and/or nylon yarns.

Following the embroidery step, the base material is processed through a machine which draws in the loose threads of the embroidery and cuts these off.

Thereafter, a plastic finish is laminated, by heat sealing, to the back side 18 of base material 16, such finish being identified by numeral 20 in FIG. 4 which shows the laminated assembly identified by numeral 22. The laminating of such plastic finish to the back side of base material 16 gives body to the embroidered laminated assembly 22 so as to facilitate the die cutting operation which follows as the next step in the manufacturing procedure.

FIG. 5 illustrates panel 24 obtained from assembly 22 by die cutting of the latter into the illustrated shape. Panel 24 comprises a pair of mirror symmetrical panel sections 26 and 28 joined together by a narrower neck portion 30. Panel 26, and panel 28, the latter bearing decorative design 14, are of generally rectangular configuration although it will be understood that other geometrical configurations could equally well be used. Similarly, if desired, panel 26 could have incorporated therein its own embroidered design 14 or any other design which may be suitable.

Following the die cutting operation resulting in the formation of panel 24, the latter may be folded midway, at the neck portion thereof, causing panel sections 26 and 28 to be in juxtaposed relationship enabling the overedging of the matched peripheral edges of the panel sections, such overedging being identified by numeral 32 in FIG. 1 and being effectuated by a triple needle merrow machine. It will be noted in FIG. 1 that the merrowing terminates in the vicinity of neck portion 30 to leave opposite openings 34 and 36 at the neck portion to define a passageway in which key ring 10 may be received. The merrowing step usually leaves exposed the tails of the merrowing thread which tails are pulled through the back side of the merrow overlock stitch with the excess being cut off. Subsequent insertion of key ring 10 completes the entire manufacturing procedure for the key ring, which is now ready for use.

It will be apparent that the resulting attachment 12 is highly decorative and securely assembled to impart thereto a long and durable life, although the manufacturing costs thereof, by means of the procedure of the invention set forth above, are comparatively low.

While there is herein shown and described the preferred embodiment of the invention, it will be understood that the invention may be embodied otherwise than as herein specifically illustrated or described, and that in the illustrated embodiment certain changes in the details of construction and in the form and arrangement of parts may be made without departing from the underlying idea or principles of this invention within the scope of the appended claims.

I claim:

1. A method of making a decorative attachment for a key ring comprising the steps of:
    (a) embroidering on a plastic base material a plurality of side-by-side decorative designs,
    (b) laminating by heat sealing a plastic finish to the side of said base material opposite to said embroidered designs,
    (c) die cutting said base material into at least one panel having mirror symmetrical panel sections separated by a neck section of narrower width than the width of said panel sections, at least one of said panel sections containing at least one decorative design,
    (d) folding said die cut panel midway of said neck section whereby said panel sections are in juxtaposed relation, and
    (e) joining by overedging the peripheral edges of said juxtaposed panel sections for the entire extents thereof but leaving said neck section edges unsecured to define a passageway at said neck section for insertion therein of a key ring.

2. A method in accordance with claim 1, wherein loose threads formed during the embroidering step are drawn in and cut off.

3. A method in accordance with claim 1, wherein said panel sections are substantially rectangular in shape.

4. A method in accordance with claim 1, wherein said base material comprises a cast urethane, expanded and unsupported plastic.

* * * * *